United States Patent [19]
Dahill

[11] Patent Number: 5,977,649
[45] Date of Patent: Nov. 2, 1999

[54] WIND ENERGY CONVERSION SYSTEM

[76] Inventor: Henry W. Dahill, 2378 NW. McDougal Ct., Prineville, Oreg. 97754-9302

[21] Appl. No.: 08/980,159

[22] Filed: Nov. 26, 1997

[51] Int. Cl.[6] ..................................................... F03D 11/00
[52] U.S. Cl. ................................. 290/55; 890/44; 415/2.1
[58] Field of Search ................................. 290/43, 44, 54, 290/55; 415/2.1; 416/196 A, 197 A

[56] References Cited

U.S. PATENT DOCUMENTS

| | | | |
|---|---|---|---|
| 3,720,840 | 3/1973 | Gregg | 290/55 |
| 3,944,840 | 3/1976 | Troll | 290/55 |
| 4,116,581 | 9/1978 | Bolie | 415/2 |
| 4,127,356 | 11/1978 | Murphy | 415/2 |
| 4,140,433 | 2/1979 | Eckel | 415/2 |
| 4,204,795 | 5/1980 | Forrest | 415/2 |
| 4,357,130 | 11/1982 | Forrest | 416/197 A |
| 4,421,452 | 12/1983 | Rougemont | 415/4 |
| 4,606,697 | 8/1986 | Appel | 415/2 R |
| 4,850,265 | 7/1989 | Raisanen | 98/37 |
| 5,009,569 | 4/1991 | Hector, Sr. et al. | 415/4.1 |
| 5,350,273 | 9/1994 | Hector, Sr. et al. | 415/4.1 |
| 5,457,346 | 10/1995 | Blumberg et al. | 290/55 |
| 5,709,419 | 1/1998 | Roskey | 290/55 |

Primary Examiner—Nicholas Ponomarenko
Attorney, Agent, or Firm—Chase & Yakimo, L.C.

[57] ABSTRACT

A system for collecting and channeling wind energy includes funnel-shaped wind collectors rotatably attached to elevated platforms for collecting wind streams at higher initial velocities. A fantail assembly rotates the inlet end of the funnel into the face of the wind. The funnel is slidably connected to a railing atop the platform to maintain the inlet of the funnel at a desired relationship with the wind stream as well as to preclude separation of the funnel from the platform. Wind entering the inlet of the funnel-shaped collector flows toward a reduced outlet end of the collector resulting in an increased velocity. The collected air is channeled through a tubular branch conduit and merged into a transmission conduit of equal diameter for delivery to a transmission assembly. The transmission assembly includes a nose rotor which compresses and directs air away from the central axis of rotation of a downstream propeller and onto the propeller blades at increased velocity for rotation of an attached drive shaft. Upon use of a plurality of wind collectors, the respective branch conduits are merged into the transmission conduit at spaced intervals therealong so as to increase the velocity of the air stream delivered to the transmission conduit and downstream transmission assembly.

20 Claims, 8 Drawing Sheets

WIND ENERGY CONVERSION SYSTEM

BACKGROUND OF THE INVENTION

This invention relates to a wind energy conversion system and, more particularly, to a system which increases the velocity of collected wind for downstream use.

Wind power as an energy source has become increasingly popular in the present era of environmental consciousness and concern over pollution resulting from energy production. Wind energy is desirable in that its production is economical, environmentally non-polluting, and it conserves the limited supply of other natural resources. Apparatus for the collection of wind energy and conversion of the same to another form of energy exist in the prior art. Windmills anti other wind power conversion devices obtain power by converting a wind stream into a mechanical motion capable of driving a downstream mechanical device or an electrical power generator.

Although assumably effective in operation, known devices do not maximize the potential energy output available from wind energy. The methods and apparatus for conversion of wind energy described in the prior art are inadequate for two primary reasons: (1) wind energy is inefficiently collected and channeled to the ultimate conversion mechanism, and (2) insufficient wind velocity is available for maximum energy conversion. It is known in the art that the power generated by a propeller type windmill is directly proportional to the square of the diameter of the propeller blade tips and the cube of the wind velocity. An increase in the velocity of wind engaging a propeller, therefore, will exponentially increase the power generated by a propeller-type windmill. Thus, it is desirable to have an apparatus which uses a plurality of efficient wind collectors to collect and channel wind to a propeller-type assembly in a manner which increases the velocity of the collected wind stream prior to downstream conveyance and passage across a downstream propeller associated with a conversion assembly.

SUMMARY OF THE INVENTION

In response thereto I have invented a novel wind energy conversion system wherein a wind stream is collected through a plurality of funnel-shaped wind collectors. The wind stream is concentrated and increased in velocity prior to engaging a downstream transmission assembly which efficiently converts the energy in the wind stream to rotation of a drive shaft. Each wind collector is rotatably attached to an elevated platform to enhance collection of wind at higher initial velocities than may be found at lower elevations. A fin having a fantail is connected to the top of each collector. This structure rotates the collector to a position directly facing the wind regardless of the wind's direction or frequency of variation. A conduit extends from the outlet of each collector. Each conduit is merged at spaced intervals into a single downstream transmission conduit of the same diameter so that wind air stream flowing from one conduit is not obstructed by air flow from another conduit. The merger of the branch conduits into a single transmission conduit of identical dimension increases the wind velocity in the transmission conduit for delivery prior to the propeller-type transmission assembly.

The propeller-type transmission assembly includes a propeller coupled to a drive shaft. The wind first engages a rotatable nose cone. The configuration of the nose cone channels the incoming air stream away from the propeller's center axis of rotation and directs the air stream of increased velocity into radially extending vanes on the propeller. The drive shaft is coupled with the propeller and upon rotation can drive downstream devices connected thereto.

It is therefore a general object of this invention to provide a wind energy conversion system to convert wind energy to mechanical or electrical power.

Another object of this invention is to provide a wind energy conversion system, as aforesaid, which collects wind streams through a plurality of funnel-shaped wind collectors, said streams being increased in velocity at points within the system.

A further object of this invention is to provide a wind energy conversion system, as aforesaid, which orients the wind collectors in a direction facing the wind stream for optimum collection thereof.

A still further object of this invention is to provide a wind energy conversion system, as aforesaid, which elevates the funnel-shaped wind collectors to enhance collection of wind streams having higher initial velocities.

A further object of this invention is to provide a wind energy conversion system, as aforesaid, having a plurality of branch conduits through which collected wind streams are channeled from the collectors for merger into a single downstream conduit of equal dimension for further concentration and increase in velocity.

A further object of this invention is to provide a wind energy conversion system, as aforesaid, having a propeller-type transmission system for converting the energy of the collected wind streams into rotation of a drive shaft.

Yet another object of this invention is to provide a wind energy conversion system, as aforesaid, having a propeller-type transmission system which increases the velocity of the collected wind stream passing therethrough.

A further object of this invention is to provide a wind energy conversion system, as aforesaid, having exhaust ports for the discharge of the collected wind streams following passage through the transmission assembly.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
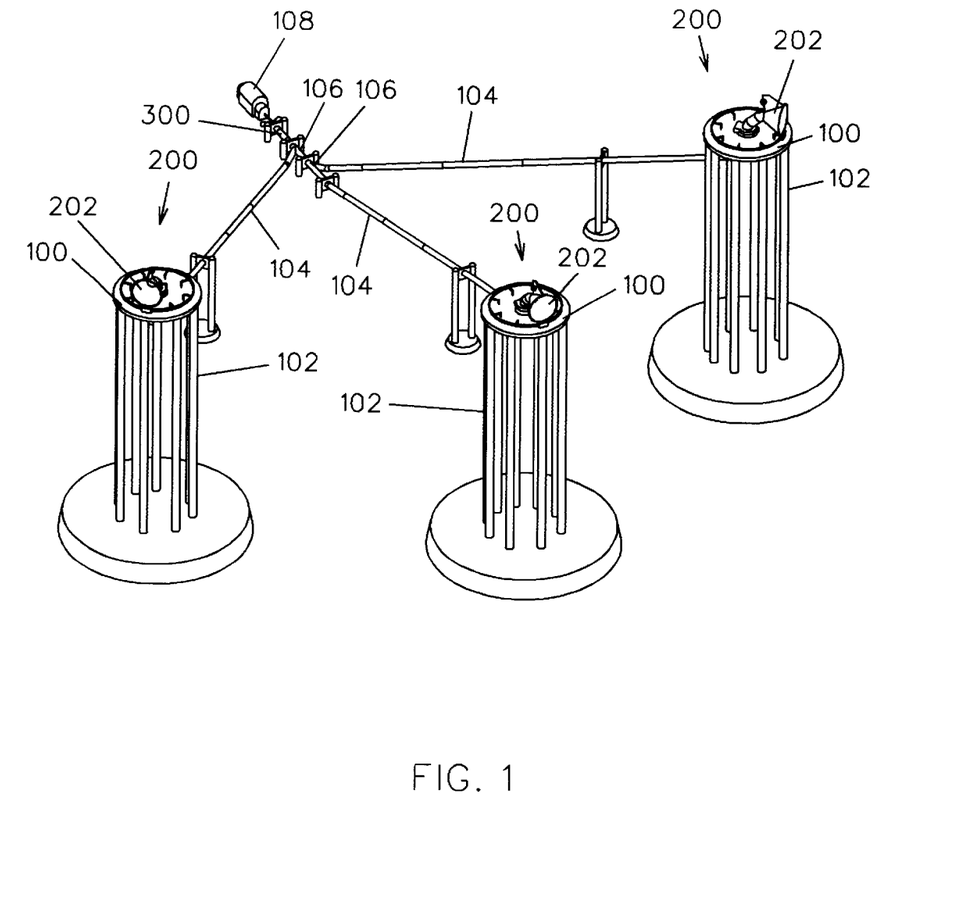
FIG. 1 is an overall perspective view of the wind power conversion system having three elevated platforms and wind collectors.

Turning more particularly to the drawings, FIG. 1 shows a wind energy conversion system having a wind collector assembly 200 (FIG. 2) rotatably attached atop each of three elevated circular platforms 100. The function and attachment of a wind collector assembly 200 is further described below. Each elevated platform 100 is mounted atop a multi-legged platform support 102. Branch conduits 104 downwardly extend from each collector 202 for connection to a transmission conduit 106 connected to the transmission housing 300. Although conduits 104 are shown as being of extended length, it is understood that platforms 100 may be immediately adjacent the transmission conduit 106 and/or housing 300. It is understood that while a wind energy conversion system having three wind collectors and platforms is shown by way of illustration in FIG. 1, other configurations and numbers of cooperating wind collectors are possible.

Figure 2:
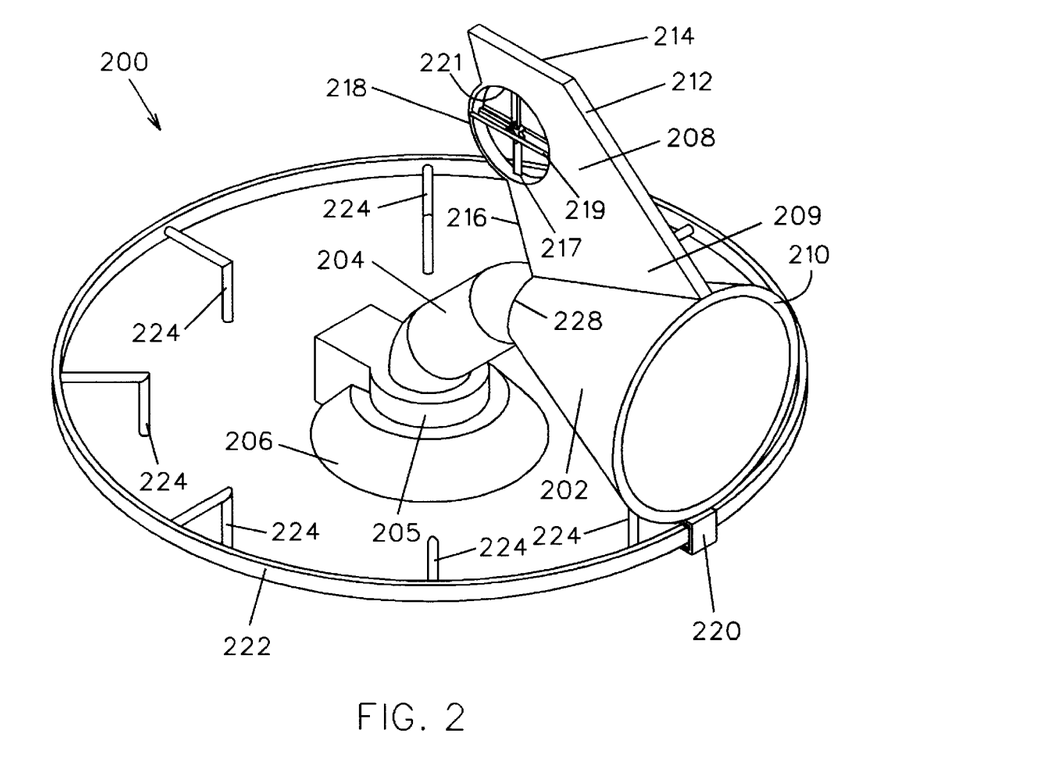
FIG. 2 is a perspective view of one funnel-shaped wind collector showing the collector attached to a circular guide rail.
Figure 3:
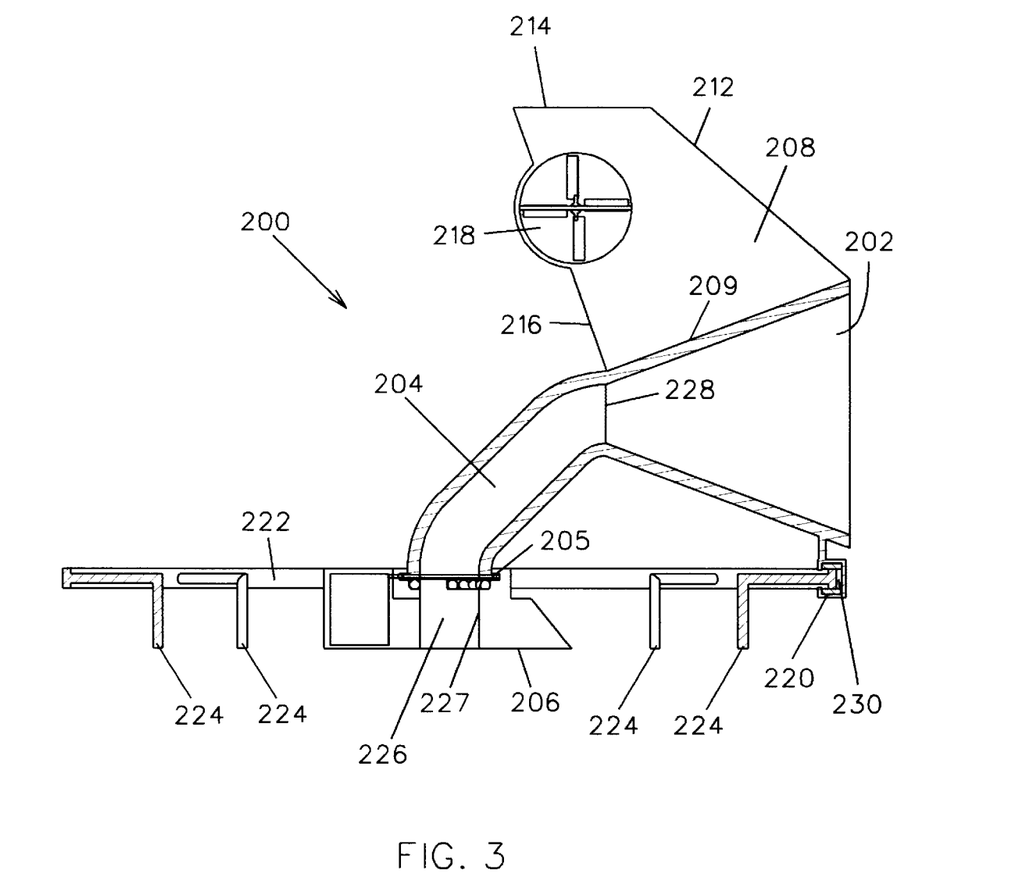
FIG. 3 is a central sectional view of the wind collector shown in FIG. 2.
Figure 4:
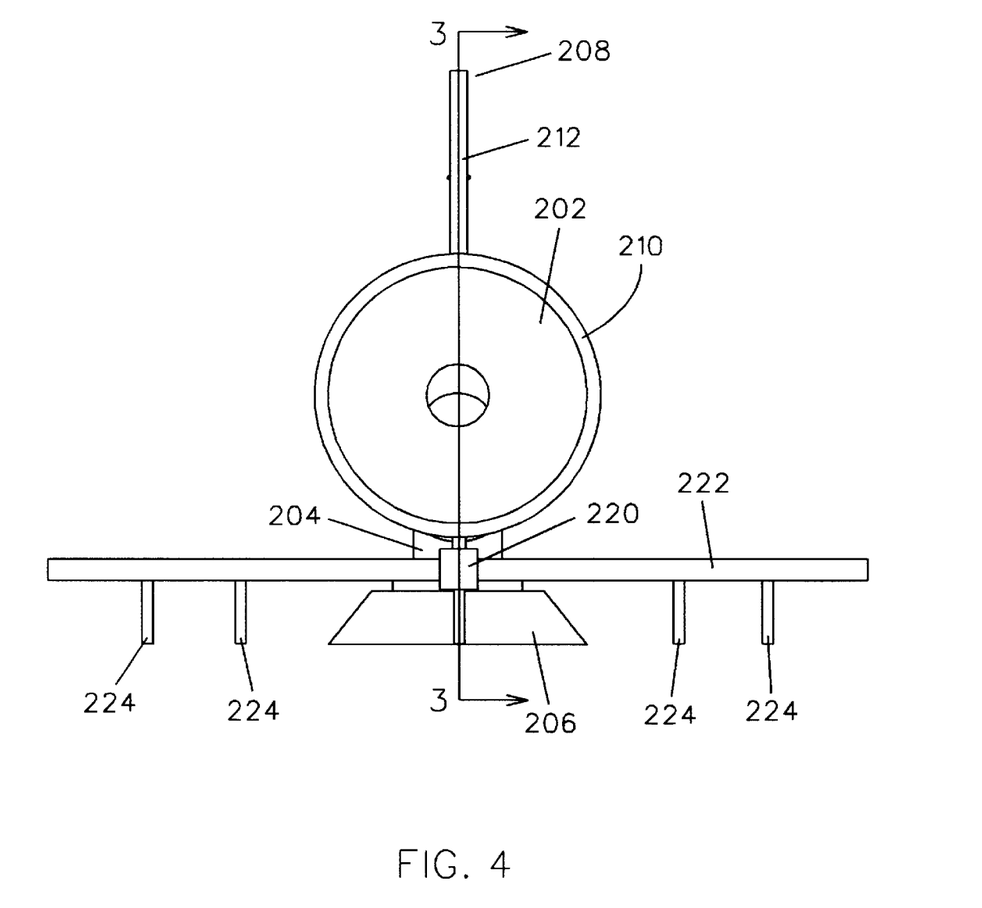
FIG. 4 is a front view of the wind collector shown in FIG. 2.
Figure 5:
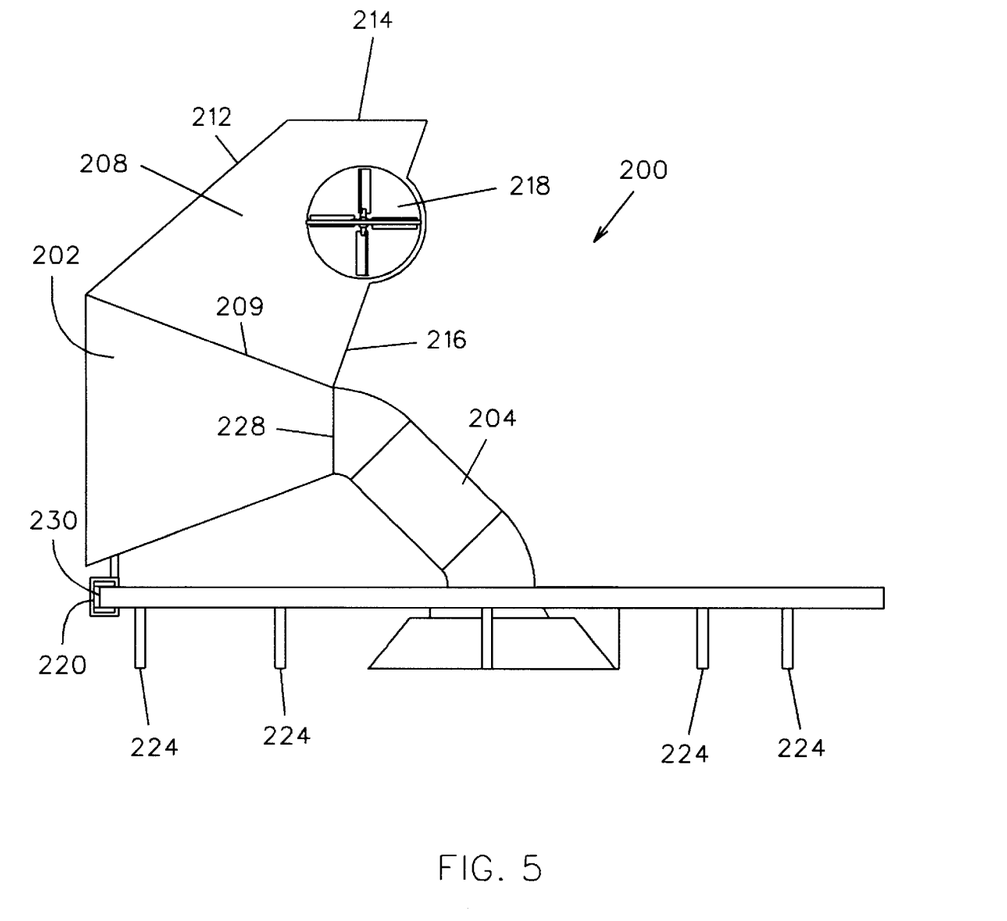
FIG. 5 is a side view of the wind collector shown in FIG. 2.

FIGS. 2 and 3 show the wind collector assembly 200. Wind collector 202 presents a conical or funnel-shaped structure presenting an open inlet end surrounded by rim 210 extending to a truncated end 228 coupled to a receiving tube 204. A fin 208 upwardly extends from the top of each collector 202 with the fin 208 generally being normal to the inlet edge 210. A base 209 of said fin rearwardly extends from the rim 210 of the collector 202 to the truncated end 228. A front edge 212 of the fin 208 angularly extends upward and rearward from the rim 210 of the collector 202 to a top edge 214 that is parallel to the platform 100. A rear edge 216 of the fin 208 angularly extends upward and rearward between the end 228 of the collector and top edge 214. Within fin 208 is a fantail 218, the fantail 218 including a propeller 219 rotatably mounted to a support 217 which spans aperture 221.

The bottom of collector rim 210 is attached to a bracket 220 that is slidably coupled to a circular railing 222. The circular railing 222 is attached to the platform 100 with railing supports 224 and thus defines a circular path about an imaginary vertical axis extending through the platform 100. A receiving tube 204 is attached to a collar 205 which is rotatably mounted to a base 206 by a ball bearing assembly/race 230 combination housed within base 206. An exhaust port 227 extends through the base 206 and registers with an aperture (not shown) in the platform 100 upon mounting of base 206 thereto. Thus, the collector is rotatably mounted to the base 206 which in turn is mounted to the underlying platform 100. Bracket 220 slidably couples the wind collector 202 to the railing 222 so as to prevent collector 202 from being blown off the platform 100. Also, this relationship assures that the plane of the inlet end of the collector is maintained at a desired normal relationship to the platform 100 so as to position the inlet at an optimal relationship with an incoming wind stream.

A wind stream bearing on the side walls of the fin 208 will cause the wind collector 202 to rotate. Also, the propeller 219 will rotate causing an additional thrust to further rotate the collector 202. This rotation will occur until the front edge 212 of fin 208 is normal to the wind stream. Thus, the inlet end is normal to the wind stream. A wind stream entering the inlet end of collector 202 increases in velocity as it flows through the reduced truncated end 228 and into the collector tube 204. The wind stream flows through port 227 and into the inlet of each branch conduit 104 for delivery to the downstream conduit 106 connected to the inlet end of housing 303 of transmission assembly 300. In the preferred embodiment, multiple collectors 202 are employed as shown in FIG. 1, the conduit 104 from each collector being merged into a single a downstream conduit 106 of equal diameter at spaced junctures therealong so that a wind stream flowing from one conduit 104 is not obstructed or inhibited by the wind stream flowing from another conduit 104. Efficient air flow is thereby preserved. The air stream velocity is further increased by this merger of a plurality of branch conduits 104 into the single transmission conduit 106 of identical dimensions. The combined wind stream is then channeled through a propeller-type transmission assembly 300 located within housing 303 of a diameter as in conduit 106.

Figure 6:
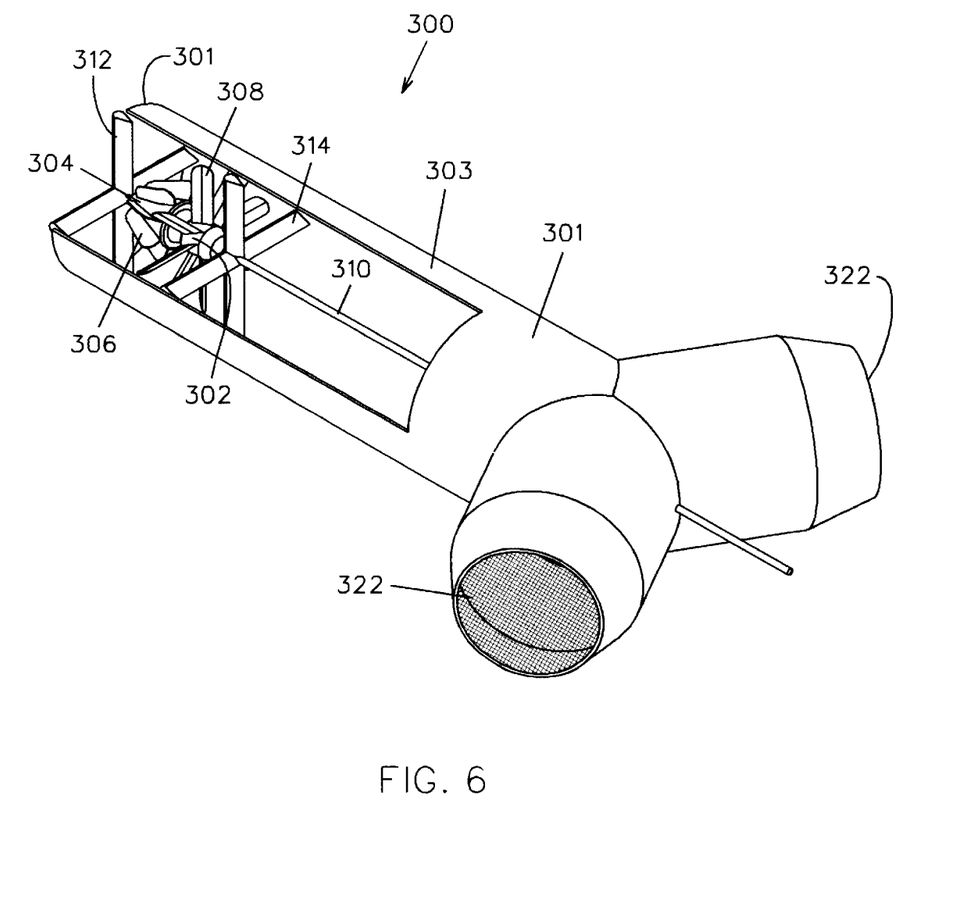
FIG. 6 is a fragmentary perspective view of the housing for the transmission assembly with a portion removed to show the components therein.
Figure 7:
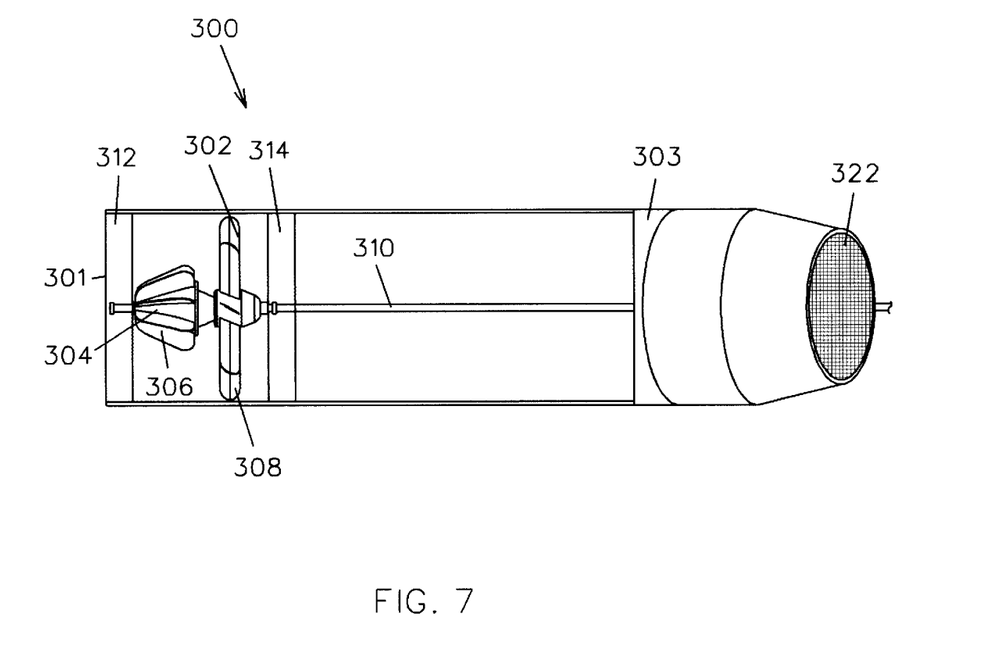
FIG. 7 is a central side view of the housing shown in FIG. 6 with a portion of the support braces removed to show the drive shaft passing therethrough.
Figure 8:
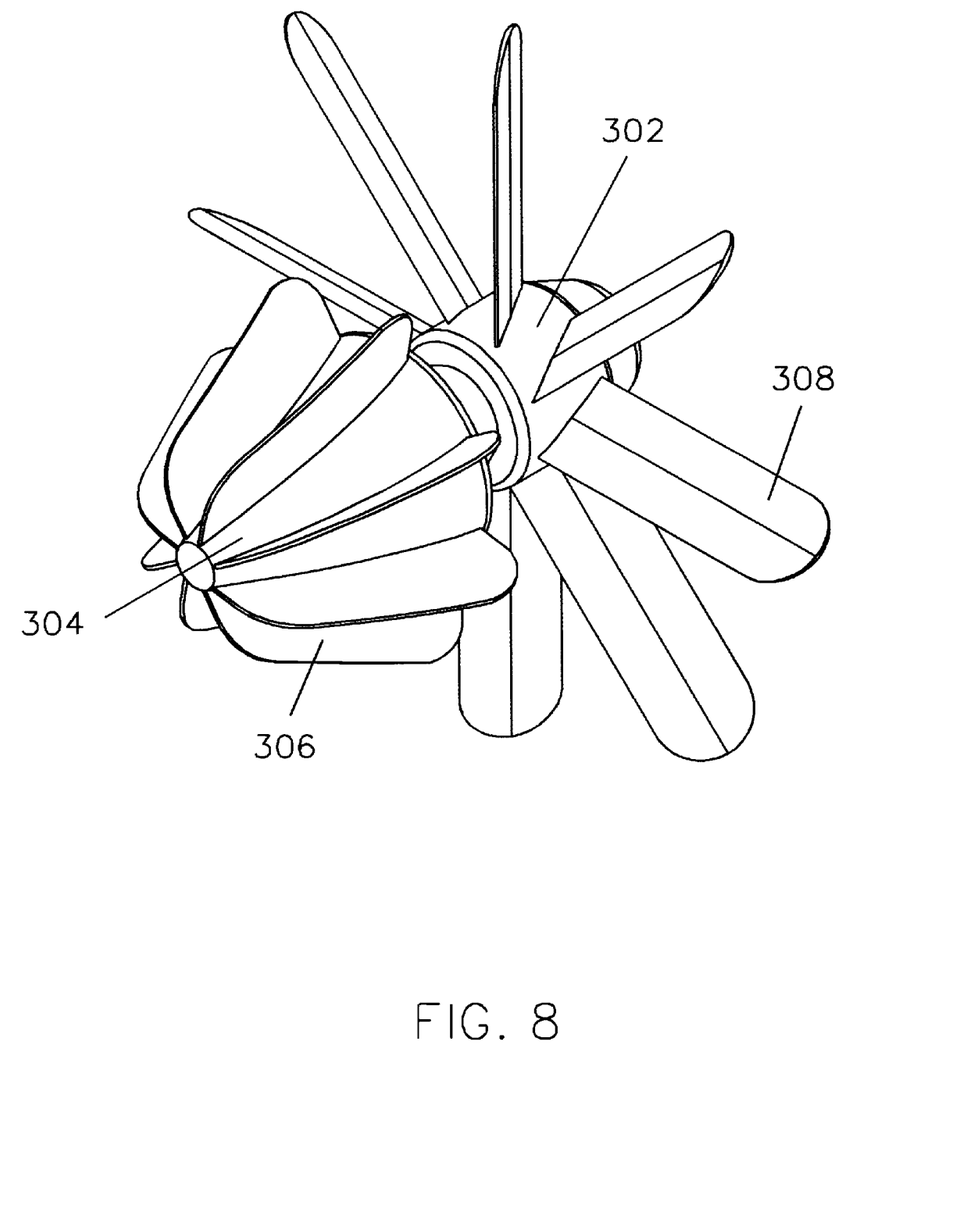
FIG. 8 is a perspective view of the drive components of FIG. 6 on an enlarged scale.

Turning to FIGS. 6 and 7, the propeller-type transmission assembly 300 comprises a propeller 302 and an upstream nose cone 304 coupled to drive shaft 310. The nose cone increases in diameter between the upstream and downstream ends and has a plurality of longitudinally extending helical blades 306 thereon. Air entering the housing 303 first engages the smaller end of nose cone 304 and is directed by the diverging helical blades 306 away from the propeller's central axis of rotation and into a plurality of radially extending vanes 308 on the propeller 302. Accordingly, the nose cone 304 compresses the incoming air stream from conduit 106 so as to increase its velocity prior to engaging the vanes 308 on propeller 302.

The propeller 302 and/or nose cone 304 are attached to a drive shaft 310. The drive shaft 310 rotatably extends through one or more support braces 312 and 314, said support braces being fixedly attached to the interior walls of the housing 303 of the propeller assembly 300 and profiled in a manner so as to present very little resistance to air flow. The air stream of increased velocity engages the propeller 302, causing the propeller 302 and drive shaft 310 to rotate. The drive shaft 310 thus produces mechanical energy for connection to a downstream point, e.g., an electrical generator 108 (FIG. 1) or other downstream device. The air stream exits the housing 200 through exhaust ports 322 downstream of the propeller 302 thereby reducing back pressure and the accompanying turbulence within the housing 303.

Accordingly, the wind energy conversion system as above described collects and channels wind energy in a manner so as to maximize the energy available for conversion to mechanical or electrical power.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A device for collection of energy provided by a wind stream comprising:
   a platform presenting a base;
   a funnel presenting an open end and a truncated end, said open end presenting an inlet of a first cross sectional area for passage of a wind stream at a first velocity therethrough, said truncated end presenting an outlet of a cross sectional area smaller than said first cross sectional area for passage of the wind stream at a second increased velocity therethrough;
   means for rotatably mounting said funnel to said platform base with said inlet of said funnel circumscribing an imaginary circular path about an imaginary axis extending through said platform base during said rotation;

a railing mounted about said circular path;

means for coupling said funnel to said railing;

conduit means in communication with said outlet end for conveying the wind stream from said outlet to a downstream location.

2. The device as claimed in claim 1 further comprising means on said funnel for interaction with the wind stream, whereby the wind stream interaction moves said inlet of said funnel to a position facing the wind stream.

3. The device as claimed in claim 2 wherein said interaction means comprises:

a fin on said funnel;

an aperture in said fin;

a rotor;

means for mounting said rotor in said aperture, contact of said fin and rotor by the wind stream urging said rotation of said funnel about said axis to said position of said inlet facing the wind stream.

4. The device as claimed in claim 1 wherein said rotatable mounting means comprises:

a base mounted to said platform with said imaginary axis passing therethrough;

collar means rotatably mounted to said base with said conduit means of said funnel joined to said collar means, a rotation of said collar means rotating said funnel connected thereto.

5. The device as claimed in claim 1 wherein said coupling means comprises:

a bracket configured to slide along said rail; and means for connecting said bracket to said funnel for a slidable movement of said bracket along said rail concurrent said rotation of said funnel.

6. The device as claimed in claim 5 wherein said bracket is connected to said inlet of said funnel.

7. The device as claimed in claim 1 further comprising:

a housing having an inlet end in communication with said conduit means for receiving the conveyed wind stream;

a drive train mounted within said housing and operably responsive to the wind stream passing through said housing inlet end;

a shaft mounted within said housing and to said drive train for rotatable movement upon said operable response of said drive train, said drive shaft having a downstream end adapted for connection to a downstream location.

8. The device as claimed in claim 7 wherein said drive train comprises:

a nose cone having a configuration presenting an upstream end of a first diameter and a downstream end of a second larger diameter relative to said housing inlet;

a rotor connected to said drive shaft, said rotor having a plurality of vanes mounted thereon adjacent said downstream end of said nose cone, the nose cone configuration increasing the velocity of the wind stream passing through said inlet of said housing for interaction with said rotor vanes and a rotation thereof, said rotation of said rotor rotating said drive shaft.

9. The device as claimed in claim 7 further comprising at least one port in said housing downstream of said drive train for exhaust of the wind stream from said housing.

10. The device as claimed in claim 8 further comprising at least one port in said housing downstream of said rotor for exhaust of the wind stream from said housing.

11. A device for collection of energy provided by a wind stream comprising:

a platform presenting a base;

means on said base presenting a configuration for increasing a velocity of a wind stream therethrough, said means presenting an inlet end and downstream outlet end;

means for rotatably mounting said velocity increasing means to said platform base with said inlet end circumscribing an imaginary path about an imaginary axis extending through said platform base during said rotation;

a railing mounted about said path;

means for coupling said velocity increasing means to said railing;

conduit means in communication with said outlet end for conveying the wind stream flowing through said outlet end to a downstream location.

12. The device as claimed in claim 11 further comprising a fin on said velocity increasing means for contact with the wind stream, whereby the wind stream contact moves said inlet end to a position facing the wind stream.

13. The device as claimed in claim 12 further comprising:

an aperture in said fin;

a rotor;

means for mounting said rotor in said aperture, a contact of said rotor by the wind stream rotating said rotor to further urge said inlet end to said position facing the wind stream.

14. The device as claimed in claim 11 wherein said coupling means comprises:

a bracket configured to slide along said rail; and means for connecting said bracket to said velocity increasing means for a slidable movement of said bracket along said rail concurrent with a movement of said a velocity increasing means.

15. A device for collection of energy provided by a wind stream comprising:

a platform presenting a base;

a funnel presenting an inlet of a first cross sectional area for passage of a wind stream at a first velocity therethrough, said funnel further presenting an outlet of a second cross sectional area smaller than said first cross sectional area of said inlet for passage of the wind stream at a second increased velocity therethrough;

means for mounting said funnel to said platform base in movement about an imaginary axis extending through said platform base;

means for restraining movement of said funnel inlet to an imaginary path about said axis; and conduit means in communication with said outlet for conveying the wind stream from said outlet to a downstream location.

16. The device as claimed in claim 15 wherein said restraining means comprises:

a track defining said path;

means for coupling said funnel in movement about said track.

17. The device as claimed in claim 16 wherein said coupling means comprises:

a bracket configured to slide along said track; and means for connecting said bracket to said funnel for a slidable movement of said bracket along said track concurrent with said movement of said funnel.

18. The device as claimed in claim 17 wherein said bracket is connected to said funnel inlet.

19. The device as claimed in claim 15 wherein said inlet presents an opening generally normal to said base.

20. The device as claimed in claim 15 further comprising:
a fin on said funnel generally normal to said inlet;
an aperture in said fin;
a rotor;
means for mounting said rotor in said aperture, whereby a contact of said wind stream with said fin and said rotor urges said inlet end of said funnel into a position facing the wind stream.

* * * * *

UNITED STATES PATENT AND TRADEMARK OFFICE
CERTIFICATE OF CORRECTION

PATENT NO. : 5,977,649
DATED : November 2, 1999
INVENTOR(S) : Henry W. Dahill

It is certified that error appears in the above-identified patent and that said Letters Patent is hereby corrected as shown below:

Column 5, line 22, after "platform" insert --base--.

Column 5, line 24, after the first occurrence of "said" insert --mounting means--.

Signed and Sealed this

Sixth Day of June, 2000

Attest:

Attesting Officer

Q. TODD DICKINSON

Director of Patents and Trademarks